United States Patent Office 2,723,999
Patented Nov. 15, 1955

2,723,999

FLUORINATED ALCOHOL-ETHYLENE OXIDE CONDENSATES

Frank M. Cowen, Norwalk, and Richard K. Madison, Stamford, Conn., assignors to American Cyanamid Company, New York, N. Y., a corporation of Maine No Drawing. Application January 15, 1954,
Serial No. 404,394

11 Claims. (Cl. 260—615)

The present invention relates to new organic compounds and to such compounds useful as non-ionic surface active agents having desirable surface tension values, interfacial tension values, and like characteristics and properties.

Surface active agents have hitherto been used in the textile, paper, dyeing, tanning and related industries, which agents have the power of reducing the surface tension of aqueous solutions and other media used therein. Such compounds have customarily possessed a long chain alkyl, alkaryl or aralkyl radical of 8 or more carbon atoms as the hydrophobic group and a sulfate, carboxyl, sulfonate, or like radical, as the hydrophilic group, whereby the necessary inter-phase balance of surface active properties and hydrophobic and hydrophilic characteristics is obtained.

The stability of such surface active compounds and their general inertness to chemical reaction is, of course, an important industrial criterion in the evaluation and application thereof and many compounds, although possessing highly desirable surface active properties, are commercially unsatisfactory and undesirable due to their lack of stability and inertness.

It is therefore a principal object of the present invention to provide novel compounds having desirable surface active properties and characteristics, which compounds need not possess a long chain alkyl, alkaryl or aralkyl radical to establish the necessary hydrophobic properties and which possess great stability and inertness to chemical reaction.

The novel compounds of the present invention are defined as monopolyfluoroalkyl ethers of polyethylene or polypropylene glycols having the following structural formula:

$$C_xF_{2x+1}CH_2O(C_pH_{2p}O)_nH$$

wherein $x$ is a number from 1 to 5; $p$ is 2 or 3; and $n$ is a number from 1 to about 200 or more.

The novel compounds of the present invention may be readily prepared by reacting alcohols having the formula $RCH_2OH$, wherein R is a completely fluorinated alkyl radical $(C_xF_{2x+1})-$ having up to five carbon atoms, and the desired number of moles of ethylene oxide or propylene oxide. These alcohols may, in turn, have been previously prepared by the reduction of the corresponding carboxylic acids having the formula RCOOH, wherein R is a completely fluorinated alkyl radical, the preparation of which is well known and described in the literature and which may be made, for example, by the electrolysis of the hydrocarbon acid or anhydride in hydrogen fluoride, whereby the fluorinated acid fluoride is formed which may be subsequently hydrolyzed to the acid.

Representative fluorinated alcohols of such a group which have been found useful as starting materials for forming the novel compounds of the present invention are trifluoroethanol and heptafluorobutanol but it is to be noted that these are cited as illustrative and are not to be construed as limitative of the invention.

The number of moles of ethylene oxide or propylene oxide which may be reacted with the fluorinated alcohol may vary from as low as 1 mole of oxide per mole of alcohol up to as high as 200 moles or more of oxide per mole of alcohol. As a matter of fact, there would appear to be no upper limit to the number of moles of oxide which can be so condensed. However, for the specific uses of the compounds as surface active agents, it has been found that the range of from 1 to about 25 moles of ethylene oxide per mole of alcohol provides better inter-phase balance. The optimum number of moles of oxide combined with the alcohol depends upon many factors such as the intended use of the resulting compound, the water- or oil solubility characteristics desired therein, the chain length of the fluorinated alkyl radical, etc.

The invention will be further described in greater detail by the following specific examples. It is to be understood, however, that although these examples may describe in particular detail some of the specific features of the invention, they are given primarily for purposes of illustration and the invention in its broader aspects is not to be construed as limited thereto.

*Example I*

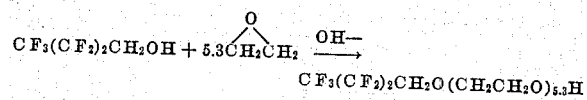

| Reactants | grams | moles |
|---|---|---|
| Heptafluorobutanol CF₃(CF₂)₂CH₂OH | 50 | 0.25 |
| Ethylene Oxide | 58 | 1.32 |
| Sodium Hydroxide (catalytic amount—1% on weight of reactants as a 50% aqueous solution). | | |

The heptafluorobutanol and alkali were charged into a three-neck flask equipped with a thermometer, stirrer, ethylene oxide addition tube and a Dry Ice condenser. Ethylene oxide was added intermittently, over a period of four and one-half hours at a temperature of 80–85° C. Additional heating at 80–85° C. for four hours gave complete absorption of the ethylene oxide. The yield was 108 grams of liquid product.

*Example II*

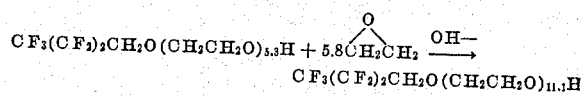

| Reactants | grams | moles |
|---|---|---|
| Product from Example I | 75 | 0.174 |
| Ethylene Oxide | 44 | 1.0 |

Continued as in Example I. This liquid product weighed 119 grams.

*Example III*

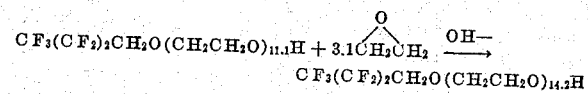

| Reactants | grams | moles |
|---|---|---|
| Product from Example II | 50 | 0.074 |
| Ethylene Oxide | 10 | 0.23 |

Continued as in Example I. The liquid product weighed 60 grams.

Example IV

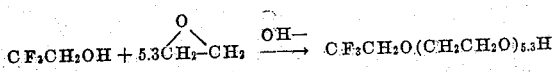

| Reactants | grams | moles |
|---|---|---|
| Trifluoroethanol (CF₃CH₂OH) | 25 | 0.25 |
| Ethylene Oxide | 58 | 1.32 |
| Sodium Hydroxide (Catalytic amount—1% on weight of reactants as a 50% aqueous solution). | | |

The tri-fluoroethanol and alkali were charged into a three-neck flask equipped with a thermometer, stirrer, ethylene oxide addition tube and a Dry Ice condenser. Ethylene oxide was added intermittently over a period of four and one-half hours at a temperature of about 65–70° C. Additional heating at a temperature of about 65–70° C. for four hours gave complete absorption of the ethylene oxide. The yield was 83 grams of liquid product.

Example V

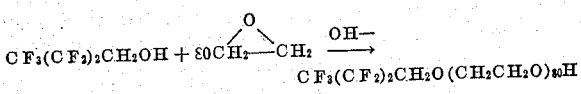

| Reactants | grams | moles |
|---|---|---|
| Heptafluorobutanol CF₃(CF₂)₂CH₂OH | 50 | 0.25 |
| Ethylene Oxide | 880 | 20.0 |
| Sodium Hydroxide (catalytic amount—1% on weight of reactants as a 50% aqueous solution). | | |

The heptafluorobutanol and alkali were charged into a three-neck flask equipped with a thermometer, stirrer, ethylene oxide addition tube and a Dry Ice condenser. Ethylene oxide was added intermittently, over a period of nineteen and one-half hours at a temperature of about 80–85° C. Additional heating at a temperature of about 80–85° C. for 4 hours gave complete absorption of the ethylene oxide. The yield was 930 grams of liquid product.

Example VI

The procedures set forth in Example V were followed substantially as set forth therein with the exception that 4 moles (232 grams) of propylene oxide replaced the ethylene oxide. The yield was 282 grams.

The surface tension of various solutions of the condensation product of heptafluorobutanol and 4.3 moles of ethylene oxide in water (age of surfaces—5 seconds) at 25° C. was determined to be as follows:

| Concentration, g./100 ml. | Surface Tension, dynes/cm. |
|---|---|
| 0.1 | 49.0 |
| 0.5 | 32.5 |
| 1.0 | 29.1 |
| 1.3 | 23.9 |
| 10.0 | 23.7 |

A comparison of the effect of the condensation product of heptafluorobutanol and 4.3 moles of ethylene oxide (referred to hereinafter as agent A) in 1% water solutions (age of surfaces—5 seconds) at 25° C. was made with other surface active agents as follows:

| Agent | Surface Tension (dynes/cm.) |
|---|---|
| Agent A | 29.1 |
| Isopropyl naphthalene sodium sulfonate | 32.6 |
| Diisobutyl sodium sulfosuccinate | 49.1 |

A further comparison was made at a concentration of 0.5% water solutions under similar conditions.

| Agent | Surface Tension (dynes/cm.) |
|---|---|
| Agent A | 32.5 |
| Diamyl sodium sulfosuccinate | 35.2 |
| Diisobutyl sodium sulfosuccinate | 53.4 |

Although we have described but a few specific examples of our invention, we consider the case not to be limited thereby nor to the specific substances mentioned therein, but to include various other equivalent compounds of similar constitution as set forth in the claims appended hereto. It is understood that any suitable changes or variations may be made without departing from the spirit or scope of the inventive concept.

What we claim is:

1. Compounds having the formula $$C_xF_{2x+1}CH_2O(C_pH_{2p}O)_nH$$

wherein $x$ is a number from 1 to 5; $p$ is a number between 1 and 4; and $n$ is a number from 1 to about 200.

2. The condensation product of an alcohol having the formula $$C_xF_{2x+1}CH_2OH$$

wherein $x$ is a number from 1 to 5 and a member of the group consisting of ethylene oxide and propylene oxide.

3. The condensation product of heptafluorobutanol and ethylene oxide.

4. The condensation product of trifluoroethanol and ethylene oxide.

5. The condensation product of heptafluorobutanol and propylene oxide.

6. The process of producing compounds having the formula $$C_xF_{2x+1}CH_2O(C_pH_{2p}O)_nH$$

wherein $x$ is a number from 1 to 5; $p$ is a number between 1 and 4; and $n$ is a number from 1 to about 200 which comprises condensing one mole of an alcohol having the formula $$C_xF_{2x+1}CH_2OH$$

wherein $x$ is a number from 1 to 5, with from 1 to about 200 moles of a member of the group consisting of propylene oxide and ethylene oxide.

7. A surface active agent comprising a condensation product having the formula $$C_xF_{2x+1}CH_2O(CH_2CH_2O)_nH$$

wherein $x$ is a number from 1 to 5; and $n$ is a number from 1 to 25.

8. A surface active agent comprising the condensation product of heptafluorobutanol and from 1 to about 25 moles of ethylene oxide.

9. A surface active agent comprising the condensation product of trifluoroethanol and from 1 to about 25 moles of ethylene oxide.

10. The process of producing surface active agents having the formula $$C_xF_{2x+1}CH_2O(CH_2CH_2O)_nH$$

wherein $x$ is a number from 1 to 5; and $n$ is a number from 1 to about 25 which comprises condensing one mole of an alcohol having the formula $$C_xF_{2x+1}CH_2OH$$

wherein $x$ is a number from 1 to 5, with from 1 to about 25 moles of ethylene oxide.

11. The condensation product of an alcohol having the formula $$C_xF_{2x+1}CH_2OH$$

wherein $x$ is a number from 1 to 5 and ethylene oxide.

References Cited in the file of this patent

UNITED STATES PATENTS 2,631,975    Lawson    Mar. 17, 1953